March 2, 1943.    W. D. HERSHBERGER    2,312,761
SWEEP CIRCUIT GENERATOR FOR CATHODE RAY TUBES
Filed Sept. 26, 1940

Inventor
William D. Hershberger

Attorney

Patented Mar. 2, 1943

2,312,761

UNITED STATES PATENT OFFICE 2,312,761

SWEEP CIRCUIT GENERATOR FOR CATHODE RAY TUBES

William D. Hershberger, Haddonfield, N. J., assignor to Radio Corporation of America, a corporation of Delaware Application September 26, 1940, Serial No. 358,462

14 Claims. (Cl. 250—27)

This invention relates to a sweep generator for a cathode ray tube and especially to a sweep generator which provides alternately two sweep voltages of different frequencies.

In devices employing a cathode ray tube, it is often desirable to indicate simultaneously two different phenomena or to indicate measurements on main and vernier scales. This may be done by applying alternately to the electrodes of a cathode ray tube, voltages corresponding to the events to be indicated together with appropriate sweep voltages. If the rate of alternation is sufficiently high, owing to the persistence of vision, the indications on the cathode ray fluorescent screen will appear continuous.

An object of the present invention is to provide means for deriving alternately cathode ray sweep voltages corresponding to different frequencies. Another object is to provide means for sweeping alternately a cathode ray at different rates whereby two scales may be provided. Another object is to provide a sweep generator for establishing main and vernier scales for a cathode ray tube. An additional object is to provide means for deriving cathode ray sweep voltages of different frequencies and of predetermined amplitude ratios. A still further object is to provide means for deriving pairs of voltages of different frequencies such that one voltage of each pair differs 90° in phase but equals in amplitude the other member of the pair for rotating a cathode ray at rates corresponding to said frequencies.

Figure 1:
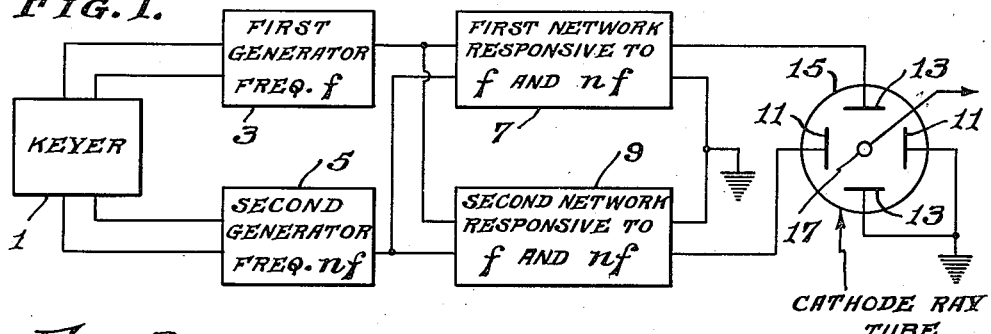
Figure 2:
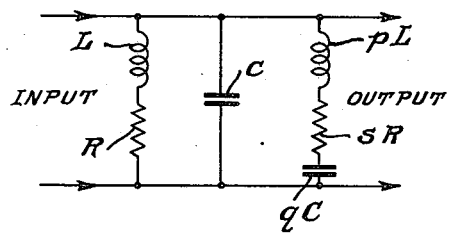
Figure 3:
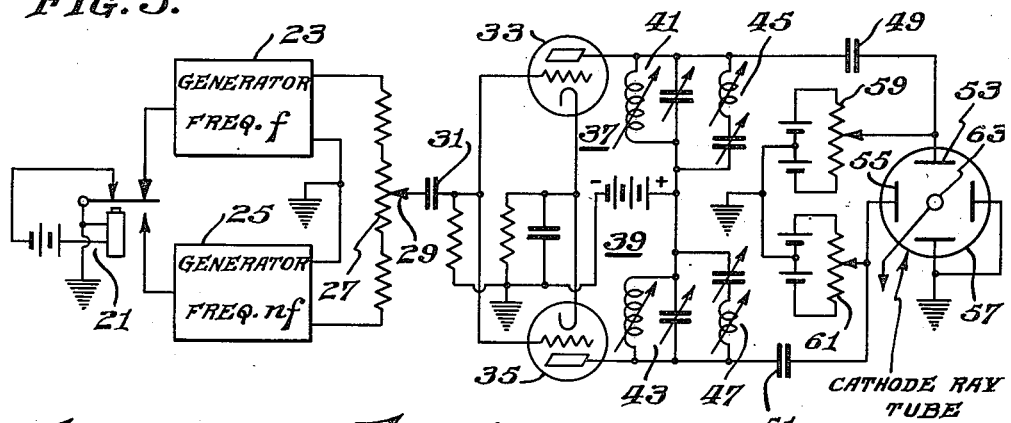
Figure 4:
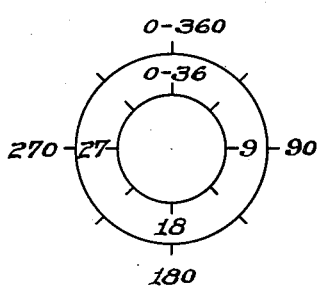
Figure 5:
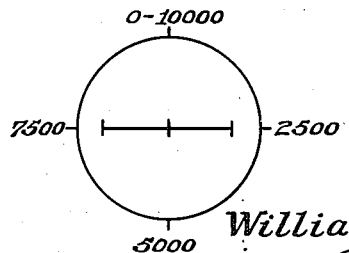
Figure 5:

The invention will be described by referring to the accompanying drawing in which Fig. 1 is a block diagram of the elements of the invention; Fig. 2 is a diagram of a network employed in the invention; Fig. 3 is a schematic circuit diagram of one embodiment of the invention; and Figs. 4 and 5 are illustrations of the types of cathode ray sweep derived according to the invention.

Referring to Fig. 1, a keyer 1 is arranged to operate alternately a first generator 3 and a second generator 5. The first generator furnishes alternating currents of frequency $f$; the second generator furnishes alternating currents of frequency $nf$. One generator may be employed instead of two provided it can supply alternately currents of two frequencies, which may be alternately applied to the inputs of a first network 7 and a second network 9. The networks, which will hereinafter be described, include elements so designed and arranged that each of the networks is responsive to currents of the two frequencies $f$ and $nf$. The outputs of the networks are applied respectively to the horizontal and vertical deflecting elements, 11 and 13, respectively, of a cathode ray tube 15. The cathode ray tube preferably includes a radial deflecting electrode 17, although other methods of deflection may be used. For example, U. S. Patent 2,121,359 of Luck and Norton describes a circuit used in producing radial deflections.

Since the currents of the two frequencies are applied alternately, it follows that the two networks will respond first to the currents of one frequency, for example $f$, and then to the currents of the other frequency $nf$. If the elements of the networks are adjusted to resonate at the frequencies characterizing the applied currents, the output voltages from the two networks will be in phase and straight line traces of sinusoidal characteristics will alternately appear on the screen of the cathode ray tube. Since these traces will be superimposed they are not ordinarily useful. However, the traces may be readily separated by making one elliptical or circular. Either or both of the traces may be made elliptical as follows: One of the elements in each network which were initially adjusted to exact resonance for currents of frequency $f$ may be readjusted so that the impedances at this frequency of the respective networks are slightly inductively reactive and slightly capacitively reactive. Or the adjustment may be made so that one impedance has a phase angle of $+45°$ and the other a phase angle of $-45°$ to produce a circular trace at frequency $f$. The elements which were initially adjusted to make the networks responsive to currents of frequency $nf$ may be readjusted (if necessary) so that the networks continue to resonate exactly to the applied currents of frequency $nf$. When the network is adjusted in this manner, circular traces of the cathode ray at frequency $f$ and straight line traces at frequency $nf$ will be produced alternately. It follows that the circular trace may be made at either frequency. Fig. 5 illustrates the type of trace which may be obtained when one of the voltages produces a circular trace which may be calibrated, for example, from zero to 10,000 feet, as shown. The linear trace is produced by the other voltage and may be calibrated in any desired units.

By adjusting the circuit elements so that both networks are reactive at both frequencies, elliptical traces will be produced at the two frequencies. If the elements are adjusted to the proper values, deflecting voltages may be generated at each frequency to produce alternately circular traces on the oscillograph screen. The radii of these circles may be made to assume any desired ratio by adjusting the ratio of the amplitude of currents from the generators. By choosing one frequency ten times as great as the other, a main scale and a vernier scale bearing a ten-to-one ratio may be used because one trace will have ten times the rate of angular rotation of the other.

Other than integral ratios may be used if desired. Fig. 4 illustrates two circular traces which are established by currents having a frequency ratio of ten to one and a difference in amplitude whereby scales covering zero to 360° may be contrasted to a scale covering zero to 36°, as shown.

One suitable network is shown in Fig. 2. While circuits of this type may be known to those skilled in the art, the instant use requires a relation between elements which may be explained by a mathematical analysis of the circuit. $L=$ the parallel inductance, $C=$parallel capacity, $R=$ resistance of L, $pL$ is the inductance, $sR=$the resistance and $qC=$the capacitance in the series branch of the circuit, $Z=$impedance, $\omega=2\pi f$, $f=$ frequency, and $n=$ratio of frequencies. The analysis establishes the following results:

(1) The frequencies for impedance maxima and minima and the relationships between these frequencies,
(2) The damping constants for the resonant frequencies,
(3) The impedances developed at resonance,
(4) The width and height of the resonance peaks for phase angles of $\pm 45°$, and
(5) Design formula for equal height resonance peaks, for ease of adjustment, etc.

The impedance of the circuit is:

$$Z(\lambda) = \frac{\lambda^2 \frac{L}{C}\left(1+\frac{R}{\lambda C}\right)\left[p\lambda L + sR + \frac{1}{\lambda qC}\right]}{H(\lambda)+G(\lambda)} \quad (1)$$

where $$H(\lambda) = \lambda^4 L^2 p + \lambda^2 \frac{L}{C}\left(1+p+\frac{1}{q}\right)+\frac{1}{C^2 q}$$

$$G(\lambda) = \lambda\left[\lambda^2 LR(p+s) + \frac{R}{C}\left(1+s+\frac{1}{q}\right)\right]$$

$$\lambda = j\omega$$

$H(\lambda)$ is an even function of $\lambda$ and is used in determining resonances. $G(\lambda)$ is an odd function of $\lambda$ and determines the impedance at resonance. The damping factor $\alpha_k$ at the two resonant frequencies $$\frac{\omega_1}{2\pi} \text{ and } \frac{\omega_2}{2\pi}$$

is $$\alpha_k = \frac{G(\lambda)}{H'(\lambda)}\bigg|_{\lambda \to j\omega_k} = \frac{R}{2L} \times \frac{\lambda^2(p+s)+\frac{1}{LC}\left(1+s+\frac{1}{q}\right)}{2\lambda^2 p + \frac{1}{LC}\left(1+p+\frac{1}{q}\right)} \quad (2)$$

$k=1$ or $2$

If the Q's of the two coils having inductance L and $pL$, respectively, and resistance R and $sR$ are equal, $p=s$ and $$\alpha_k = \frac{R}{2L} \quad (3)$$

or the damping factor at the two resonant frequencies is equal, in fact is independent of frequency. This means in particular that the time of build-up of voltage is the same at either of the circle frequencies. Throughout this analysis, equal Q's for the two coils will be assumed, as this is a reasonably good approximation and simplifies the analysis very materially. Then Equation 1 becomes $$Z(j\omega) = \frac{j\omega}{C} \cdot \frac{\omega^2 - \frac{1}{pqLC}\left(1+j\frac{1}{Q}\right)}{\omega^4 - \frac{\omega^2}{LC\sqrt{pq}}\frac{n^2+1}{n}+\frac{1}{L^2C^2pq}-j\frac{1}{LC\sqrt{pq}}\frac{n^2+1}{nQ}\left[\omega^2 - \frac{2}{LC\sqrt{pq}}\frac{n}{n^2+1}\right]} \quad (4)$$

where $n$ is defined by the equation $$n+\frac{1}{n} = \frac{1+pq+q}{\sqrt{pq}} = \frac{1}{\sqrt{pq}}+\sqrt{pq}+\sqrt{\frac{q}{p}} \quad (5)$$

If Q is reasonably large, resistance has a second order effect on frequency. The zeroes and poles of $Z(j\omega)$ are determined with adequate accuracy if we set $R=0$. Then $$Z(j\omega) = \frac{j\omega}{C}\frac{(\omega^2 - \omega_s^2)}{(\omega^2 - \omega_1^2)(\omega^2 - \omega_2^2)} \quad (6)$$

where $$\omega_s^2 = \frac{1}{LCpq} \quad (7)$$

$$\omega_1^2 = \frac{1}{nLC\sqrt{pq}} \quad (8)$$

$$\omega_2^2 = \frac{n}{LC\sqrt{pq}} \quad (9)$$

$Z(j\omega) = 0$ when $\omega = \omega_s$. This is the frequency for series resonance in the $pL$—$qC$ branch of the circuit.

$Z(j\omega) = \infty$, when $\omega = \omega_1$ or $\omega_2$. These are the poles of the function, and for these frequencies we have maximum amplifier gain.

It will be noted that $$\omega_2 = n\omega_1 \quad (10)$$

or $n$ turns out to be the ratio between the two circle frequencies. We may confine ourselves without loss of generality to values of $n$ greater than unity. It is first to be noted that $$\omega_s^2 = \frac{\omega_1\omega_2}{\sqrt{pq}} \quad (11)$$

Also, in all cases, by Foster's reactance theorem $$\omega_1 < \omega_s < \omega_2 \quad (12)$$

Let $$\omega_p^2 = \frac{1}{LC}$$

be the resonance frequency of the parallel L—C circuit if isolated from the series $pL$—$qC$ circuit. We at once note that $$\omega_s\omega_p = \omega_1\omega_2 \quad (13)$$

and $$\omega_1 < \omega_p < \omega_2 \quad (14)$$

Thus both $\omega_p$ and $\omega_s$ lie between $\omega_1$ and $\omega_2$. Also $$\omega_p^2 = \omega_1\omega_2\sqrt{pq} \quad (15)$$

If we begin by specifying $\omega_1$ and $\omega_2$, we may adjust both $\omega_s$ and $\omega_p$ to any desired values between these limits by choice of the product $pq$. The position of the zero between the two peaks determines the relative height of the two impedance peaks at the two resonant frequencies as well as the ease of adjustment of the circuit to produce satisfactory timing circles. We now proceed to calculate these impedances from Equation 4.

The low frequency resonant impedance is $$Z(j\omega_1) = \frac{L}{CR} \times \frac{\frac{n}{\sqrt{pq}} - 1}{n^2 - 1} \quad (16)$$

and the high frequency resonant impedance is $$Z(j\omega_2) = \frac{L}{CR} \times \frac{n\left(n - \frac{1}{\sqrt{pq}}\right)}{n^2 - 1} \quad (17)$$

One result of interest is this:

$$Z(j\omega_1) + Z(j\omega_2) = \frac{L}{CR} \quad (18)$$

which tells us that irrespective of the height of the two peaks, their sum is a constant, namely, $L/CR$ which is the same as that developed by a single parallel resonant $L-C$ circuit. The two peaks divide the available gain between them in a manner determined by the location of the zero between them.

If we adjust $pq$ so that the gain at the two frequencies is of the same order of magnitude, the impedance zero is well removed from both impedance maxima. Then the numerator of (4) approximates a pure imaginary and does not change appreciably in value over the narrow range involved in sweeping across a resonance peak. To find the width of the resonance curve at the points where $Z(j\omega)$ has a phase angle of 45 degrees, we equate the real and $j$-parts of the denominator of (4) and solve the biquadratic equations which result. The four frequencies satisfying this condition are found to be $$\omega_{\Delta 1} = \omega_1 \left(1 \pm \frac{1}{2Q}\right) \quad (19)$$

and $$\omega_{\Delta 2} = \omega_2 \left(1 \pm \frac{1}{2Q}\right) \quad (20)$$

The width of the peaks at the 45 degree points is determined solely by circuit $Q$ and is exactly the same as that characterizing a circuit with but one peak.

Also $$Z(j\omega_{\Delta k}) = \frac{1}{\sqrt{2}} Z(j\omega_k) < 45° \quad (21)$$

If we set $$Z(j\omega_1) = Z(j\omega_2) = \frac{L}{2CR}$$

and $$\left.\begin{array}{l} p = \left(\frac{2n}{n^2-1}\right)^2 \\ q = \left(\frac{n^2-1}{n^2+1}\right)^2 \end{array}\right\} \quad (22)$$

Under these conditions we have equal height resonance peaks.

Circuits which were very easy to adjust for circles and in which the series condenser controlled the low frequency circle and the shunt condenser the high frequency circle were built on setting $\sqrt{pq}$ equal to unity. In this case $$\omega_s = \omega_p = \sqrt{\omega_1 \omega_2} = \sqrt{\frac{1}{LC}}$$

$$Z(j\omega_1) = \frac{L}{CR} \frac{1}{n+1}$$

$$Z(j\omega_2) = \frac{L}{CR} \frac{n}{n+1} = nZ(j\omega_1)$$

$$\left.\begin{array}{l} p = \frac{n}{(n-1)^2} \\ q = \frac{(n-1)^2}{n} \end{array}\right\} \quad (23)$$

$$\left.\begin{array}{l} \omega_1^2 = \frac{1}{nLC} \\ \omega_2^2 = \frac{n}{LC} \end{array}\right\} \quad (24)$$

The shortcoming of this arrangement is that the high frequency peak is $n$ times as high as the low frequency peak.

In order to determine the optimum $pq$ product a study was made of Equation 5:

$$n + \frac{1}{n} = \frac{1 + pq + q}{pq}$$

This study showed that the circuit is best set up and adjusted if $$\frac{2n}{n^2+1} < \sqrt{pq} < 1$$

With best results if $\sqrt{pq}$ is of the order of 10% or 20% larger than $$\frac{2n}{n^2+1}$$

It should be understood that a number of equivalent circuits may be used to achieve the same end. For example, two parallel oscillatory circuits may be connected in series.

One practical embodiment of the invention is shown in Fig. 3 in which a vibrator switching device 21 is used to key on alternately a first generator 23, and a second generator 25. The generators may be vacuum tube oscillators, which may be keyed by applying suitable bias voltages. The outputs of the generators are applied to a potentiometer 27 which is used to determine the ratio of the generator voltages. The movable terminal 29 of the potentiometer is connected through a blocking capacitor 31 to the inputs of a pair of amplifiers 33, 35. It should be understood that the amplifiers are convenient means for coupling the generators to a pair of networks 37, 39 and that it is not necessary that the amplifiers exhibit increased outputs.

Each of the networks 37, 39 includes a shunt circuit 41, 43 and a series circuit 45, 47. The shunt circuits and the series circuits have constants which are chosen to produce the desired resonant responses when the networks are adjusted as a whole. The outputs from the networks are applied through blocking capacitors 49, 51 to the vertical and to the horizontal deflecting elements 53, 55, respectively, of a cathode ray tube 57. The elements 53, 55 are preferably connected to centering potentiometers 59, 61, respectively. The voltages corresponding to the events to be timed are applied to a radial deflecting electrode 63 or the like.

Thus the invention has been described as a sweep generator for cathode ray tubes. The generator includes a source of alternating currents of two frequencies which are applied alternately to a pair of networks. The networks are designed to select, without any switching, currents of first one frequency, then the other. By adjusting the networks, voltages may be obtained to produce elliptical traces on the cathode ray tube to which the currents are applied. The traces may be made circles of different diameters. The rates of angular rotation may be related to form main and vernier scales. The invention has general application in measuring systems; specific uses are described in copending application Serial No. 358,776, filed September 28, 1940, by William D. Hershberger for "Sensitive distance measurement device."

I claim as my invention:

1. In combination, a sweep circuit generator, a cathode ray tube including means for establishing therein a cathode ray, a source of alternating currents of two frequencies, a pair of electrical networks, means for applying alternately said currents to said networks, each of said networks including two oscillatory circuits having constants which establish in each of said networks a pair of resonant responses corresponding to said frequencies, and means for applying the resonant voltages across said networks to said cathode ray tube to deflect said ray alternately at frequencies corresponding to said different frequencies.

2. In combination, a sweep circuit generator, a cathode ray tube including means for establishing therein a cathode ray, a source of alternating currents of two frequencies, a pair of electrical networks, means for applying alternately said currents to said networks, means for predetermining the ratio of the amplitudes of said alternating currents, each of said networks including two oscillatory circuits having constants which establish in each of said networks a pair of resonant responses corresponding to said frequencies, and means for applying the resonant voltages across said networks to said cathode ray tube to deflect said ray alternately at frequencies corresponding to said different frequencies.

3. In combination, a sweep circuit generator, a cathode ray tube including means for establishing therein a cathode ray, a source of alternating currents of two frequencies, a pair of electrical networks, means for applying alternately said currents to said networks, each of said networks including two oscillatory circuits having constants which establish in each of said networks a pair of resonant responses corresponding to said frequencies, means for making one of said oscillatory circuits in one of said networks capacitively reactive and the other inductively reactive to currents of one of said frequencies, and means for applying the resonant voltages across said networks to said cathode ray tube to deflect said ray alternately at frequencies corresponding to said different frequencies.

4. In combination, a sweep circuit generator, a cathode ray tube including means for establishing therein a cathode ray, a source of alternating currents of two frequencies, a pair of electrical networks, means for applying alternately said currents to said networks, each of said networks including two oscillatory circuits having constants which establish in each of said networks a pair of resonant responses corresponding to said frequencies, means for making the oscillatory circuits in one of said networks inductively reative to currents of one of said frequencies and for making the oscillatory circuits in the other of said networks capacitively reactive to currents of the other of said frequencies, and means for applying the resonant voltages across said networks to said cathode ray tube to deflect said ray alternately at frequencies corresponding to said different frequencies.

5. In a sweep generator of the character of claim 3, means for predetermining the ratio of the amplitudes of said alternating currents.

6. In a sweep generator of the character of claim 4, means connected to said current-applying means for predetermining the ratio of the amplitudes of said alternating currents.

7. In combination, a sweep circuit generator, a cathode ray tube including means for establishing therein a cathode ray, a first generator of alternating currents of a first frequency, a second generator of alternating currents of a second frequency, means for alternately keying said generators, a pair of amplifiers each having input and output circuits, said input circuits effectively connected to said generators, a pair of electrical networks connected to said output circuits, each of said networks including a series oscillatory circuit and a parallel oscillatory circuit and having resonant responses corresponding to said first and second frequencies, and means for applying voltages across said networks to the deflecting elements of a cathode ray tube.

8. In a sweep generator of the character of claim 7, means including said oscillatory circuits for adjusting the phase of the currents applied to said deflecting elements.

9. In combination, a sweep circuit generator, a cathode ray tube including means for establishing therein a cathode ray, a pair of generators for generating currents of different frequencies, means for keying alternately said generators, a pair of amplifiers, means for applying said currents of different frequencies to the inputs of said amplifiers, a pair of electrical networks connected respectively to the outputs of said amplifiers, each of said networks including two oscillatory circuits, said oscillatory circuits being so designed that together they exhibit two resonance peaks corresponding to said different frequencies, and means for applying said currents to said cathode ray tube to deflect said ray alternately at frequencies corresponding to said different frequencies.

10. A sweep generator of the character of claim 9 including means connected to said amplifier inputs and to said generators for adjusting the ratios of the amplitudes of the currents of said different frequencies.

11. In a sweep generator according to claim 9, means including said oscillatory circuits for adjusting the phase of the currents applied to said cathode ray tube.

12. In a sweep generator according to claim 9 including means connected to said amplifier inputs and to said generators for adjusting the ratios of the amplitudes of the currents of said different frequencies, and means including said oscillatory circuits for adjusting the phase of the currents applied to said cathode ray tube.

13. In combination, a sweep circuit generator, a cathode ray tube including means for establishing therein a cathode ray, a source of alternating currents of two frequencies, a pair of amplifiers having input and output circuits, means for applying alternately said currents to the input circuits of both of said amplifiers, a pair of electrical networks connected respectively to the output circuits of said amplifiers, each of said networks including two oscillatory circuits having constants which produce in each of said networks a pair of resonant responses corresponding to said frequencies, and means for applying the resonant currents from said networks to said cathode ray tube to deflect said ray alternately at frequencies corresponding to said different frequencies.

14. In combination, a sweep circuit generator, a cathode ray tube including means for establishing therein a cathode ray, a source of alternating currents of two frequencies, a pair of amplifiers having input and output circuits, means for applying alternately said currents to the input circuits of both of said amplifiers, a pair of electrical networks connected respectively to the output circuits of said amplifiers, each of said networks including two oscillatory circuits having constants which produce in each of said networks a pair of resonant responses corresponding to frequencies greater and less than said two frequencies whereby currents of quadrature phase are established for said two frequencies, respectively, and means for applying the resonant currents from said networks to said cathode ray tube to deflect said ray alternately at frequencies corresponding to said different frequencies.

WILLIAM D. HERSHBERGER.